UNITED STATES PATENT OFFICE.

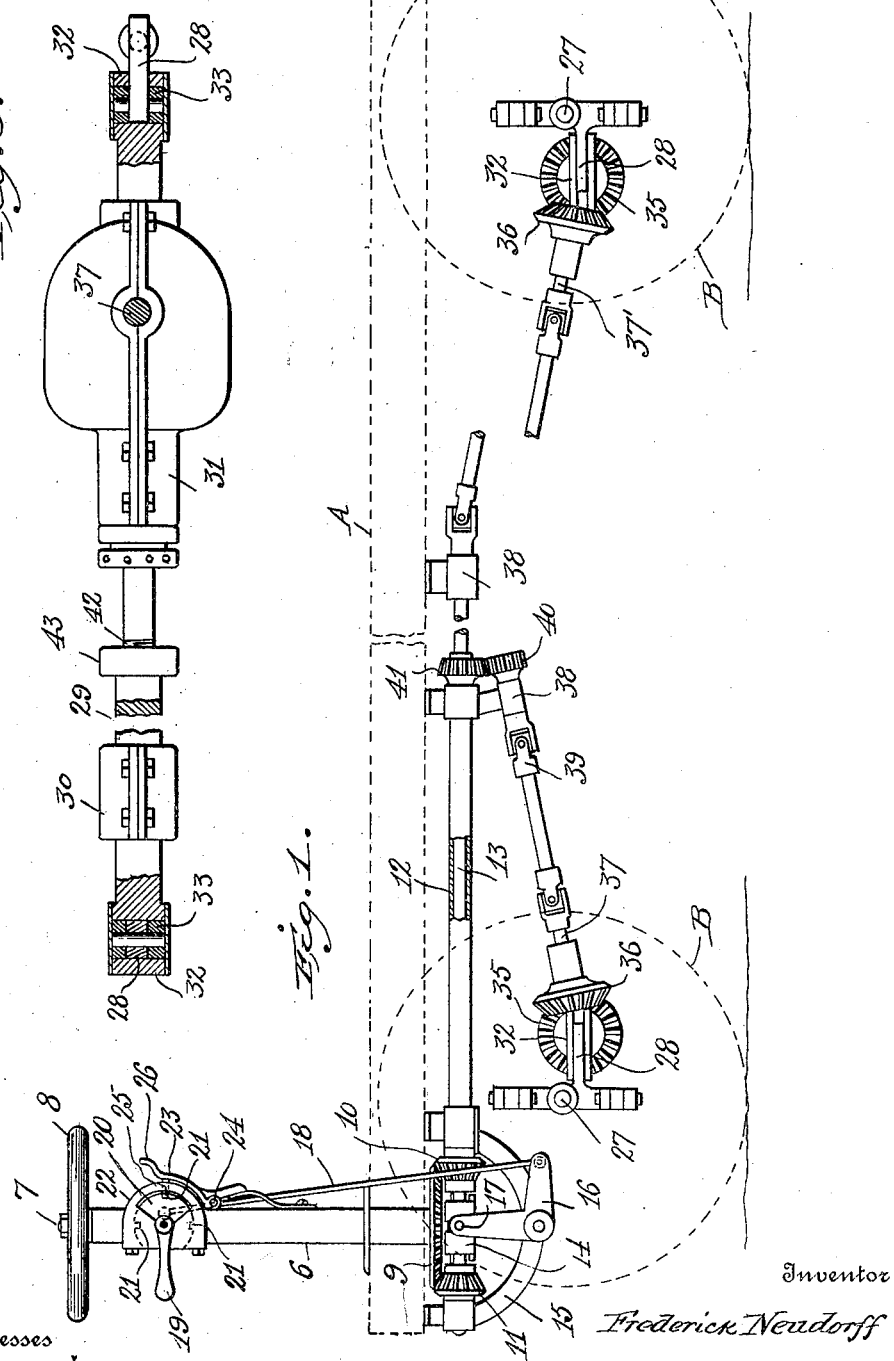

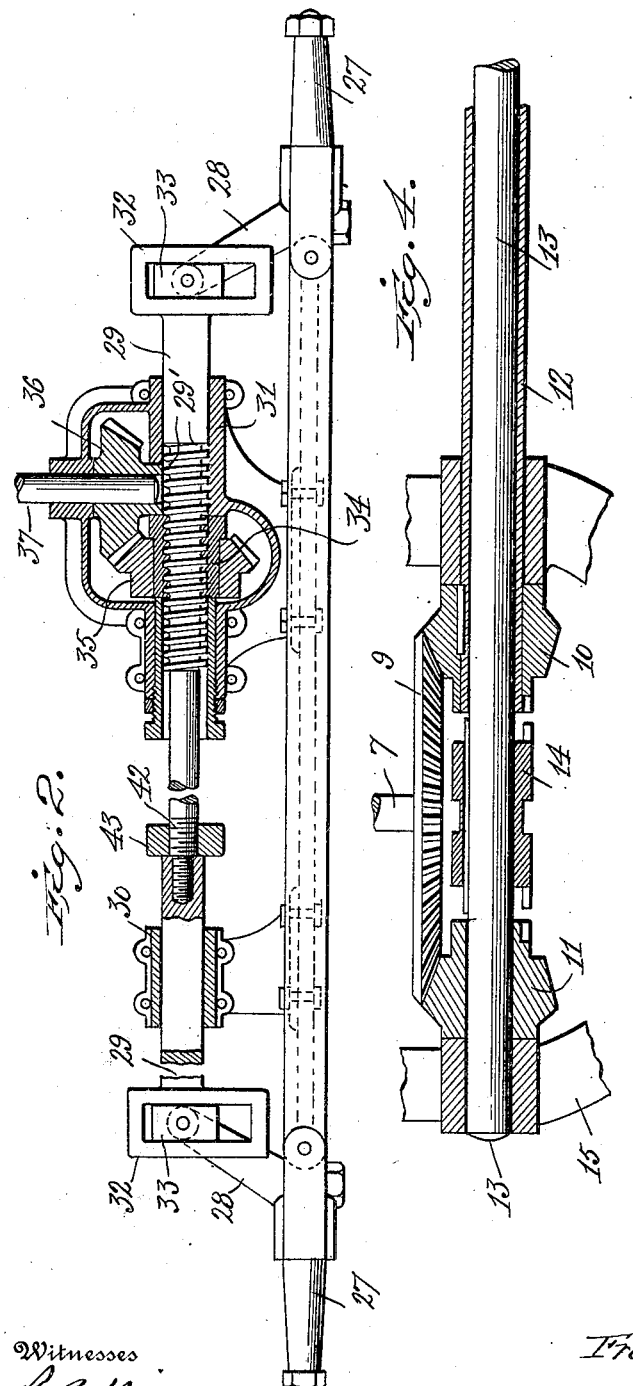

FREDERICK NEUDORFF, OF ATLANTA, GEORGIA.

STEERING MECHANISM FOR MOTOR-VEHICLES.

1,131,729.  Specification of Letters Patent. Patented Mar. 16, 1915.

Application filed December 22, 1911. Serial No. 667,381.

*To all whom it may concern:*

Be it known that I, FREDERICK NEUDORFF, a citizen of the United States, residing at Atlanta, in the county of Fulton and State of Georgia, have invented certain new and useful Improvements in Steering Mechanism for Motor-Vehicles, of which the following is a specification.

This invention relates to improvements in steering mechanism for motor vehicles and has for its particular object to provide such a mechanism that is positive in its adjustments and will prevent any back lash upon the steering wheel.

Another object is to provide a steering gear adapted to steer a plurality of sets of wheels, so that the sets can be controlled separately or together and positioned alike or differently, whereby the vehicle can be caused to turn curves or run obliquely.

With these and other objects in view, the present invention consists in the combination and arrangement of the parts as will be hereinafter more fully described, shown in the accompanying drawings, and particularly pointed out in the appended claims, it being understood that changes in the form, proportion, size and minor details, may be made within the scope of the claims without departing from the spirit or sacrificing any of the advantages of the invention.

In the accompanying drawings: Figure 1 is a side elevation of the operative portions of the device showing the vehicle platform and wheels diagrammatically. Fig. 2 is a plan view of an axle showing a portion of the steering mechanism in section. Fig. 3 is a side elevation partly in section of that portion of the steering mechanism shown in Fig. 2. Fig. 4 is a detail sectional view of a part of the operating mechanism.

Similar reference numerals in all of the figures of the drawings designate like parts.

This improved steering mechanism is especially adapted for motor vehicles wherein both the front and rear sets of wheels are operated to guide the vehicle and as shown in Fig. 1, A designates the platform and B the wheels.

In motor trucks of this class which are adapted for heavy hauling, a rigid steering post 6 is usually provided, through which extends the steering shaft 7 having a steering wheel secured thereto, marked 8. In the present invention, the lower end of said steering shaft has secured thereon a bevel gear wheel 9, which meshes with two beveled pinions 10 and 11 positioned diametrically opposite each other, the pinion 10 being keyed to a hollow shaft 12, and the pinion 11 being loosely mounted on a shaft 13 which passes through said shaft 12.

Mounted upon the shaft 13, intermediate the pinions 10 and 11, feathered to and adapted to slide thereon, is a grooved clutch-sleeve 14, having clutches at each end, which when thrown into engagement with the pinion 10, causes the shaft 12 to rotate with said pinion when the steering wheel is operated, and when said clutch sleeve is thrown into engagement with the pinion 11, causes said shaft 13 to be operated through said pinion. Means are provided to shift said clutch sleeve 14 as desired, that is, to one of three positions, viz: into engagement with pinion 10, pinion 11, or a neutral position, and said means is preferably constructed as follows:

To a suitable bracket 15, secured to the vehicle frame, is pivoted an angle lever 16, one arm of which is provided with a pin or roller 17 to engage the groove in the clutch sleeve 14, and to the other arm is pivotally connected one end of a link rod 18, whose other end is pivotally connected to one end of hand lever 19, which in turn is pivoted intermediate its length to the steering post 6. Secured to said lever 19 is a segment 20 provided with a plurality of notches 21 in its periphery, said segment being partially inclosed in a suitable housing 22.

The clutch sleeve 14 is locked in one of the three positions above mentioned, by a spring held pawl 23, which is pivoted at 24 to the post 6, the nose 25 of said pawl being adapted to engage the notches 21 in the segment 20, and said pawl is provided with hand grasp 26 whereby it can be disengaged from said notches as desired.

The axles of the vehicle are provided with the usual pivoted wheel spindles 27 having the steering arms 28, secured thereto, and in the present embodiment of the invention, said steering arms 28 are connected together with a positively guided, sliding drag link 29, preferably rectangular in cross section having threads 29' mounted in suitable supports 30 and 31, secured to the axles, and provided at their ends with elongated slotted heads 32, in which are adapted to slide the blocks 33, to which the steering arms are pivoted. Thus it will be readily seen, that a movement in either direction of the drag links 29 turns the wheel spindles upon their pivots.

Drag links 29 are reciprocated in their bearings preferably by internally threaded worm nuts 34 which engage the threads 29', and said worm nuts are parts of bevel gear wheels 35, mounted concentrically with the axes of said drag links. Gear wheels 35 mesh with bevel gear wheels 36 secured upon suitable shafts 37, 37', which are mounted in suitable bearings 38, and the supports 31, the latter being a casing around the gears 35 and 36.

Shaft 37 has a universal connection 39 intermediate its ends, and at one end is provided with a pinion 40 which meshes with a pinion 41 secured to the hollow shaft 12. Thus the drag link of the front wheels is operatively connected with the steering wheel when the clutch sleeve 14 is in engagement with the pinion 10. Shaft 37' is also provided with a universal connection, one end of which is connected to shaft 13. Thus the drag link of the rear wheels is operatively connected with the steering wheel, when the clutch sleeve 14 is in engagement with either of the pinions 10 or 11.

For convenience in mounting, the drag links are preferably formed in two sections, the end of one section being rounded and threaded as shown at 42, whereby it can be screwed into the opposing end of the other section and locked into position by the lock nut 43.

The operation of the device is as follows: Assuming that the clutch sleeve 14 is in a neutral position, as shown in the drawings, a movement of the steering wheel 8 transmits motion to the hollow shaft 12 through gears 9 and 10, the latter being keyed to said shaft, and from said hollow shaft to the drag link of the front axle through gears 40, 41, shaft 37, gears 36, 35, and worm nut 34, thus operating only the front wheels.

When the clutch sleeve 14 is shifted to the rear or in engagement with the gear 10, the hollow shaft 12 and shaft 13 are rotated in the same directions sliding both of the drag links in like directions and operating both sets of wheels, but owing to the position of the operating mechanism relative to the axles, the wheels are moved in opposite directions, positioning them to round a curve, and when the clutch sleeve 14 is shifted to the front or in engagement with the gear 10, the hollow shaft 12 and the shaft 13 are rotated in opposite directions, sliding the drag links in opposite directions and moving both sets of wheels to run in the same direction or obliquely.

As thus constructed it will be clearly seen that it is impossible to transmit any jars to the steering wheel, and in providing a positively guided drag link the wheels are positively guided and cannot deflect from any adjustment without the operation of said steering wheel.

Having thus fully described the invention what is claimed is:

1. In a steering mechanism, a guided drag-link, pivoted wheel-spindles having arms projecting therefrom, and connecting means between said arms and said drag-links, said means being bodily movable transversely relative to the axis of said drag-link.

2. In a steering mechanism, a guided drag-link provided with elongated heads at each end, pivoted wheel-spindles having arms projecting therefrom, and connecting means between said arms and elongated heads, said means being bodily movable on said elongated heads and transversely relative to the axis of said drag-link.

3. A steering mechanism, comprising a guided drag link having teeth upon a portion of its length and provided with heads at each end, blocks adapted to slide in said heads transversely relative to the axis of said drag-link and to which the ends of the steering arms of pivoted wheel spindles are pivoted, means mounted concentrically on said drag link and adapted to engage said teeth to reciprocate said drag link, and means for operating said reciprocating means.

4. A steering mechanism comprising a guided drag link having teeth, means for connecting the ends of said drag link to the steering arms of the pivoted wheel spindles of a vehicle, and means for reciprocating said drag link embodying an internally threaded gear wheel mounted on said drag link its internal threads adapted to engage the teeth on said link, a shaft provided with gear wheels on each end one of which meshes with said internally threaded gear wheel, a second shaft having gear wheels on each end one of which meshes with one of said gears on the first mentioned shaft, and a steering shaft having a hand wheel and a gear which meshes with a gear on said second mentioned shaft.

5. A steering mechanism, comprising a guided drag-link having teeth on a portion of its length, means for connecting the ends of said drag-link to the pivoted wheel spindles, an internally threaded gear mounted around said drag-link with its internal threads engaging the teeth on said link and fixed in position against other than rotary movement, and means for rotating said threaded gear.

6. A steering mechanism, comprising drag-links for both the front and rear sets of wheels of a vehicle, gear-wheels on said drag-links for reciprocating the same, a shaft provided with gear-wheels on each end one of which engages with one of the drag-link gears, a second shaft having gear-wheels on each end one of which engages the remaining gear on said first mentioned shaft, a steering shaft provided with a gear-wheel which engages the remaining gear on the second mentioned shaft, a third shaft having a gear-wheel which engages the other drag-link gear, and means for connecting said second and third shafts together to cause them to rotate in the same direction.

7. A steering mechanism, comprising drag-links for both the front and rear wheels of a vehicle, gear-wheels on said drag-links for reciprocating the same, a shaft provided with gear-wheels on each end one of which engages one of the drag-link gears, a second shaft having gear-wheels on each end one of which engages the remaining gear on said first mentioned shaft, a steering shaft provided with a gear-wheel which engages the remaining gear on the second mentioned shaft, a third shaft having a gear-wheel which engages the other drag-link gear and also a loosely mounted gear-wheel which meshes with the steering shaft gear, and means for connecting said loose gear to said third shaft to cause said second and third shafts to rotate in opposite directions.

8. A steering mechanism, comprising drag-links for both the front and rear wheels of a vehicle, gear-wheels on said drag-links for reciprocating the same, a shaft provided with gear-wheels on each end one of which engages with one of the drag-link gears, a tubular second shaft having gear-wheels on each end one of which engages the remaining gear on said first mentioned shaft, a steering shaft provided with a gear-wheel which engages with the remaining gear on the second mentioned shaft, a third shaft partially supported in said tubular second shaft and having a gear-wheel which engages the other drag-link gear, and means to cause said steering shaft to rotate said second and third shafts in the same or opposite directions.

9. A steering mechanism, comprising drag-links for both the front and rear wheels of a vehicle, gear-wheels on said drag-links for reciprocating the same, a shaft provided with gear wheels on each end one of which engages with one of the drag-link gears, a second shaft having gear-wheels on each end one of which engages the remaining gear on the said first mentioned shaft, a steering shaft provided with a gear-wheel which engages the remaining gear on the second mentioned shaft, a third shaft having a loose and tight gear on opposite ends which engage the steering wheel gear and the other drag-link gear respectively, and means keyed to slide on said third shaft beneath the steering wheel gear to cause said steering shaft to rotate said second and third shafts in the same or opposite directions.

10. A steering mechanism, comprising reciprocating drag-links for both the front and rear wheels of a vehicle, a steering shaft having a gear-wheel on its lower end, an operating connection between the steering shaft and the drag-link of the rear wheels, a second operating connection between the steering shaft and the drag-links of the front wheels, said second operating connection embodying two separate shafts geared at one end to each other and having their other ends connected rotatably to the steering wheel gear and the front drag-link respectively, adjusting means for causing said steering shaft to rotate the two separate operating connections in the same or opposite directions, and means mounted on said steering shaft for controlling said adjusting means.

11. In a steering mechanism, a drag-link, a rotatable means supported independently of said drag-link and adapted to rotate around the longitudinal axis thereof, said rotatable means supporting said drag-link and adapted to reciprocate said link back and forth in a true line, and means for rotating said rotatable means.

In testimony whereof I affix my signature in presence of two witnesses.

FREDERICK NEUDORFF.

Witnesses:
HENRY V. BONE,
FRED H. HALL.

Copies of this patent may be obtained for five cents each, by addressing the "Commissioner of Patents, Washington, D. C."